United States Patent
Wischmann et al.

(10) Patent No.: US 6,854,885 B2
(45) Date of Patent: Feb. 15, 2005

(54) METHOD FOR THE CORRECTION OF UNEQUAL CONVERSION CHARACTERISTICS OF IMAGE SENSORS

(75) Inventors: Hans-Aloys Wischmann, Henstedt-Ulzburg (DE); Michael Overdick, Langerwehe (DE); Ralf Schmidt, Aachen (DE); Roelant Visser, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 311 days.

(21) Appl. No.: 10/256,634

(22) Filed: Sep. 27, 2002

(65) Prior Publication Data

US 2003/0076922 A1 Apr. 24, 2003

(30) Foreign Application Priority Data

Sep. 29, 2001 (DE) .......................................... 101 48 371
Oct. 6, 2001 (DE) .......................................... 101 49 404

(51) Int. Cl.[7] .............................................. G01D 18/00
(52) U.S. Cl. ........................ 378/207; 378/98.8; 382/132; 250/370.09; 250/208.1; 348/674
(58) Field of Search .................... 378/19, 207, 98.8; 382/132, 274; 250/370.09, 369, 208.1, 559.1; 348/234, 674, 671–685; 358/519

(56) References Cited

U.S. PATENT DOCUMENTS 6,148,057 A * 11/2000 Urchuk et al. ................ 378/18

FOREIGN PATENT DOCUMENTS

| EP | 1 081 942 A1 | 3/2001 |
| GB | 2 314 227 A | 12/1997 |
| WO | WO 98/01992 | 1/1998 |

OTHER PUBLICATIONS

Poropat, G. V.; Nonlinear Compensation for Responsivity Nonuniformities in Cadmium Mercury Telluride Focal Plane Detector Arrays for Using in the 8 to 12 μm Spectral Region; Optical Engineering, vol. 28, No. 8, Aug. 1989, pp. 887–896.

* cited by examiner

Primary Examiner—Edward J. Glick
Assistant Examiner—Elizabeth Keaney

(57) ABSTRACT

The invention relates to a method for the correction or compensation of individual differences between the conversion characteristics of the image sensors (11) and the processing units (12) of an X-ray detector which are connected thereto. It is assumed that a functional relationship in conformity with $GW=F_i(L_{ij}(\phi))$ exists between the quantity of radiation ($\phi$) entering the detector and the grey value (GW) resulting therefrom for a pixel (j, i), where Lij describes the approximately linear behavior of the sensor arrangement (10) and Fi the non-linear behavior of the processing unit (12). For the inverse value $L_{ij}^{-1}$ a linear model function is used and for the inverse value $F_i^{-1}$ a non-linear model function is used with parameters which can be calculated from calibration measurements with different radiation quantities ($\phi_k$). During later operation of the detector these model functions can be applied to the grey values (GW) obtained in order to correct said grey values with a high precision and in real time, the storage space then required being small as a result of the use of a single non-linear inverse value for each column.

17 Claims, 2 Drawing Sheets

METHOD FOR THE CORRECTION OF UNEQUAL CONVERSION CHARACTERISTICS OF IMAGE SENSORS

BACKGROUND

The invention relates to a method for the correction of unequal conversion characteristics during the processing of the signals from image sensors which are distributed in a planar arrangement. The invention also relates to an X-ray detector which is capable of carrying out such a method.

Image sensors which are distributed in a planar arrangement can be found in various applications such as, for example, electronic cameras. Hereinafter, flat dynamic X-ray detectors (FDXD) will be considered by way of example; such detectors typically comprise several thousands of individual image sensors (pixels) which are arranged in a matrix in the form of rows and columns. The primary image signals of the image sensors are read out in rows so that all image sensors of a column are temporarily successively addressed by the read-out circuitry. The primary image signals of a column, therefore, can be (successively) routed via the same processing unit. The processing units perform amplification and conversion of primary image signals, thus forming digital grey scale values (GW) as secondary image signals.

In the described X-ray detectors a problem is encountered in that each image sensor and each processing unit has an individual characteristic so that, despite the application of a uniform quantity of radiation to all image sensors, unequal secondary image signals may occur at the output of the X-ray detector. In order to correct such individual differences between the conversion characteristics, it is known from EP 1 081 942 A1 to assume a (multidimensional) linear map between the quantities of radiation actually incident on the image sensors and the secondary image signals (grey values) appearing at the output, which map is intended to describe the individual differences of the image sensors and the processing units. This linear image is determined by approximation from a plurality of calibration measurements. Its inverse can then be applied to real measured values so as to compensate the differences between the individual image sensors. The calibration measurement is carried out on the one hand by determining a dark image which represents the output signal without any radiation ("offset"). On the other hand, a so-called gain image is calculated which represents the individual gains of the individual combinations of an image sensor and a processing unit. However, it has been found that the correction that can be achieved by means of such a method is not enough to prevent the occurrence of disturbing artifacts, that is, notably in the case of special applications such as digital subtraction angiography (DSA).

SUMMARY OF THE INVENTION

Considering the foregoing it is an object of the present invention to provide an improved method for the correction of the image signals from image sensors in a planar arrangement, which method ensures a high image quality and can also be carried out in real time, that is, notably in applications such as digital subtraction angiography.

This object is achieved by means of a method as disclosed below as well as by means of an X-ray detector system adapted to implement the described method.

A method in accordance with aspects of the invention for the correction of unequal conversion characteristics during the processing of signals from image sensors which are distributed in a planar array concerns a situation in which the individual image sensors, each having a first, individual characteristic, generate a primary image signal from a quantity of radiation received by the image sensor, and the primary image signals from a plurality of image sensors (typically image sensors of a column or half column) are all applied (successively) to the same processing unit. The processing unit has an individual, second, non-linear characteristic and produces a secondary image signal at its output.

During a preparatory step of the method, for each image sensor or for each processing unit the non-linear inverse of the above-mentioned second characteristic and the inverse of the first characteristic are determined at least approximately from calibration measurements. Finally, after the determination of said inverse values, during operation of the image sensors the secondary image signals generated by the processing units are transformed by means of the inverse values derived in the step c).

The described method thus utilizes a non-linear inverse for the correction of the secondary image signals so that it can achieve a precision which is higher than that offered by linear corrections as known from the present state of the art. For X-ray detectors this has the surprising effect that, even in special applications such as digital subtraction angiography, high image qualities can be achieved without disturbing artifacts. Because of its special approach, the method in accordance with the invention also offers the advantage that it can be carried out by means of limited storage means and computational effort and hence in real time. The means and effort are limited in that the taking into account of a non-linearity is restricted to the processing units or their second, non-linear characteristics. Because several image sensors operate via the same processing unit, their non-linear characteristic can be determined more exactly and with a higher stability of the algorithms used for that purpose.

In conformity with the method, the image sensors are preferably arranged in rows and in columns extending perpendicularly thereto, all image sensors of the same column being connected to a common processing unit. In order to read out such a field of image sensors, read-out signals are successively applied to the rows, so that the image sensors of one row can be read out in each step. Practical detectors often consist of two halves in the direction of the columns, so that the present method is to be used separately for the "upper" and "lower" half columns.

During the calibration measurements the image sensors are preferably exposed to uniform irradiation with a known quantity of radiation between zero and a maximum value for each sensor. The known quantity of radiation on the one hand and the secondary image signals resulting therefrom on the other hand thus form a number of sampling points for the mapping between the input and the output of the sensor arrangement; the inverse values searched for this mapping can be calculated from said number.

In the case of X-ray detectors whose image sensors include light-sensitive elements (for example, photodiodes), the uniform irradiation may involve uniform X-rays as well as uniform visible light which can also cause the image sensors involved to generate image signals. The visible light is advantageously so-called backlight or reset light which is emitted by a layer of light-emitting diodes or the like which is situated (viewed in the direction of incidence of the X-rays) behind the light-sensitive elements and is reflected on the light-impervious envelope of the detector so as to traverse the scintillator layer and reach the light-sensitive elements. Such a construction of an X-ray detector is described, for example, in WO 98/01992.

The non-linear inverse of the non-linear second characteristic of a processing unit is preferably approximated by a polynomial function. The coefficients of such a polynomial function can then be determined by spending only a limited amount of calculation work and typically by solving linear systems of equations.

Generally speaking, the inverse of the first characteristic can be approximated with adequate precision by a linear function; for each image sensor associated with a given processing unit this linear approximation is calculated as follows:

a) first a measuring curve $K_{ij}$ is formed for each image sensor from the calibration measurements carried out, which measuring curve describes the dependency of the secondary image signal of this image sensor on the amount of radiation;
b) subsequently, the desired linear inverse $L_{ij}^{-1}$ of the first characteristic of the image sensor considered is calculated as that linear map which, in combination with the measuring curve determined sub a) in conformity with ($K_{ij} \circ L_{ij}^{-1}$):
  1. maps a predetermined radiation value $\phi_0$ on a predetermined secondary image signal value $GW_0$, that is, $(K_{ij} \circ L_{ij}^{-1})(\phi_0) = GW_0$, and
  2. exhibits a predetermined rise $\alpha$ for said radiation value $\phi_0$, that is, $d(K_{ij} \circ L_{ij}^{-1})/d\phi(\phi_0) = \alpha$.

The linear inverse $L_{ij}^{-1}$ can notably be calculated also by means of a linear regression which determines the best compensating line for the calibration measuring values from a given grey value interval.

Because of the linear inverse values $L_{ij}^{-1}$ determined in the described manner, all measuring curves $K_{ij}$ determined during the calibration are superposed on one another at a point ($\phi_0$, $GW_0$) with the same rise. Using suitable mathematical methods, non-linear model functions can be adapted to the resultant bundle of measuring curves associated with one and the same processing unit i.

During the transformation of secondary image signals derived in real operation in order to correct the individual differences in the conversion characteristics, said secondary image signals are preferably transformed first by means of the calculated non-linear inverse values of the second characteristic and subsequently by means of the calculated inverse values of the first characteristic. As a result of this order, first the signal-modifying effect of the processing units is eliminated and subsequently the differences caused by the image sensors themselves are compensated. Such a correction of the non-linearities can be performed in real time; it advantageously consists merely of the simple and fast application of a polynomial or look-up table for each grey value GW.

The image sensors considered may be sensitive notably to X-rays. Indirectly converting image sensors have a structure consisting of two parts, that is, a scintillation layer in which the incident X-rays are converted into light quanta and a light-sensitive layer (for example, consisting of photodiodes). Such indirectly converting image sensors can also be exposed to visible light during the calibration, because such irradiation triggers the same processes in the light-sensitive layer as the scintillation light produced by X-ray quanta.

The primary image signal produced by the image sensors may notably be a quantity of charge which is read out by the downstream processing unit.

In the processing unit which is common to a plurality of image sensors the primary image signal can be amplified and possibly converted. The signal conversion preferably consists of the conversion of a quantity of charge into a voltage signal, followed by digitization (analog-to-digital conversion).

The invention also relates to an X-ray detector which includes the following elements:
A) image sensors which are arranged in rows and columns and serve to generate primary image signals;
B) processing units whereto the image sensors of a column are connected in order to generate secondary image signals on the output of the processing units;
C) a data processing unit which is arranged in such a manner that it is capable of correcting the secondary image signals, generated by the processing units, by means of a method of the described kind in relation to different conversion characteristics of the image sensors and/or the processing units.

The data processing unit is thus capable of calculating (notably from the calibration measurements) the non-linear inverse values of the characteristics of the processing units as well as the inverse values of the image sensors, and of subsequently applying these inverse values to the measuring values derived during operation, thus calculating corrected images wherefrom the effects of individual differences between the processing channels of the individual image sensors (pixels) have been removed to a high degree. The data processing unit can carry out its function notably by means of suitable computer programs (software) which are conceived in such a manner that they can carry out the execution and evaluation of calibration measurements as well as the subsequent correction of real measuring values. The X-ray detector or the computer programs can advantageously be further elaborated in conformity with the described versions of said method.

The following description, claims and accompanying drawings set forth certain illustrative embodiments applying various principles of the present invention. It is to be appreciated that different embodiments applying principles of the invention may take form in various components, steps and arrangements of components and steps. These described embodiments being indicative of but a few of the various ways in which some or all of the principles of the invention may be employed in a method or apparatus. The drawings are only for the purpose of illustrating an embodiment of an apparatus and method applying principles of the present invention and are not to be construed as limiting the present invention.

BRIEF DESCRIPTION OF THE DRAWINGS

The foregoing and other features and advantages of the present invention will become apparent to those skilled in the art to which the present invention relates upon consideration of the following detailed description of apparatus applying aspects of the present invention with reference to the accompanying drawings, wherein.

DETAILED DESCRIPTION

Figure 1:
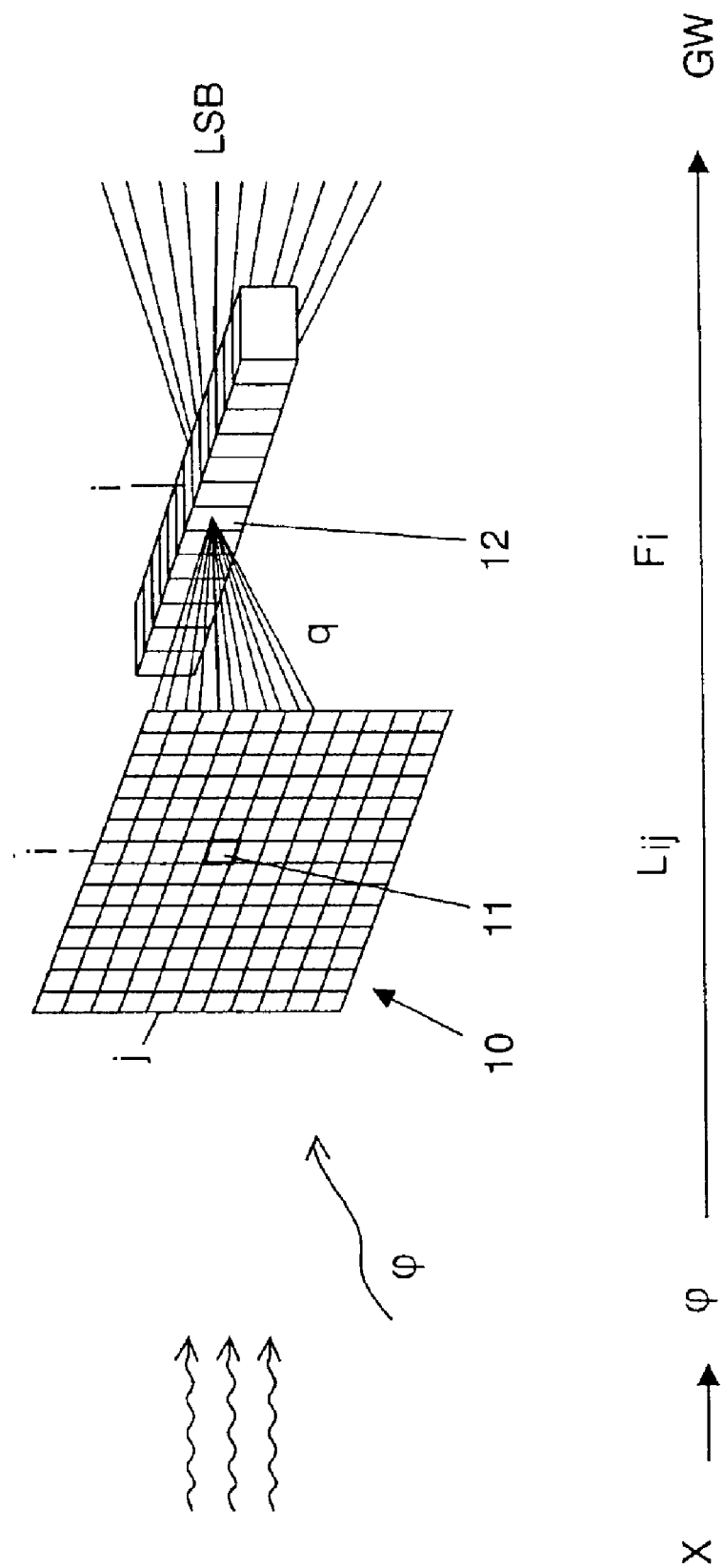
FIG. 1 is a diagrammatic representation of the construction of an X-ray detector of an X-ray system.

FIG. 1 is a diagrammatic representation of the construction of a flat dynamic X-ray detector (FDXD). The X-ray detector includes a matrix-like sensor arrangement 10 of individual image sensors 11 (pixels), the image sensors 11 being organized in rows bearing the index j and columns bearing the index i. The image sensors 11 of a column i are all connected to the same processing unit 12 in which amplification and analog-to-digital conversion of the primary image signals read out by the image sensors 11 take place. The primary image signals may notably be charges q. Because the image sensors 11 are read out one row after the other, in each read-out operation each processing unit 12 has to process only the signal from a single image sensor 11, so that no conflicts arise despite the multiple responsibilities of a processing unit 12. The output of the processing units 12 carries the secondary image signals GW which are delivered to the environment and are formed by digitized grey values.

For structural reasons a practical sensor arrangement 10 may be designed so as to have an upper half and a lower half, so that each time only half columns are read out via a common processing unit. However, this does not affect the principle of the present invention in any way, so that for the sake of simplicity it will mainly be ignored hereinafter.

During operation of the X-ray detector shown, X-rays are applied to the image sensors 11 with a dose X, thus causing the formation of charges q. During the described row-wise read-out operation such charges are converted into the grey values GW by the processing units 12.

The image sensors 11 may notably have a two-stage, indirectly converting structure. A preceding scintillator layer then forms light quanta from the incident X-ray quanta, which light quanta are converted into electric signals (charges q) in the subsequent light-sensitive layer of photodiodes. Because of the light sensitivity of the photodiodes, they can also be excited by visible light of the dose $\phi$. This light can be generated notably by means of the reset light device in the detector which is known from WO 98/01992.

The conversion steps taking place in the X-ray detector shown in FIG. 1 are summarized in the following Table 1:

multiplexing, quantized into a grey value GW by and analog-to-digital converter. These elements are combined so as to form the processing units 12 in FIG. 1. The charge amplifier has a very low non-linearity which is insignificant per se. Differences between the non-linearities of neighboring columns, however, are very pronounced because they correspond to an edge in the image whereto the human visual system is very sensitive. These non-linearity differences are disturbing notably in the case of digital subtraction angiography (DSA), because inter alia extensive spreading of the grey value contrast is performed therein. For example, in DSA the difference is formed between an image of a vessel acquired without a contrast agent and an image of the vessel acquired with a contrast agent.

According to the known prior art real-time methods for the correction of X-ray images, the locally different dark currents of the photodiodes (offset) and the locally different sensitivities of the scintillator layer (gain) are removed by subtraction of a dark image and subsequent division by a sensitivity image. This corresponds to the application of a linear transformation. Finally, defective pixels, rows and columns in such corrected images are bridged by interpolation. Moreover, for example, intermediate dark images can also be used to remove a large part of the afterglow of the scintillator as well as the residual signal of the photodiodes.

The following Table 2 shows diagrammatically the correction steps implemented at present and executed in real time on the acquired raw images of an FDXD. Overall a linear characteristic is assumed in this respect. First an averaged dark image is subtracted from the raw images. Subsequently, possibly a temporally variable dark image shift due to afterglow of the scintillator layer and/or residual signals of the photodiodes is corrected by means of intermediate dark images (see DE 196 31 624 C1). After that division takes place by an averaged, offset-corrected, uniformly illuminated image and finally interpolation of defects is performed. Overall, according to this method the limits that can be tolerated are exceeded a number of times, that is,

TABLE 1

| X-rays X | scintillator: gain $s_{ij}$ | Photons | photodiodes: offset $o_{ij}$ | charge q | amplifier: gain $F_1(q)$ | voltage u | analog-to-digital conversion | grey values GW |
|---|---|---|---|---|---|---|---|---|
|  | image sensor 11: $q = L_{ij}(X) = s_{ij}X + o_{ij}$ |  |  |  | processing unit 12: $GW = F_1(q)$ |  |  |  |

The scintillator and the photodiodes are then combined so as to form an image sensor 11 for which it has been found that it can be described very well by a linear characteristic $L_{ij}$ with the offset $o_{ij}$ and the gain $s_{ij}$. Spatial differences in the gain of the photodiodes are then ignored. The described approach, however, can be readily generalized to individually different gains of the photodiodes.

Each time one column i (in practice the columns may be subdivided, as stated before, into an upper half and a lower half) of the sensor arrangement 10 is converted into a voltage by a charge amplifier and, possibly after in respect of the mean non-linearity difference as well as the maximum non-linearity difference, so for the difference of the grey values of pixels of neighboring columns divided by their mean value.

TABLE 2

| raw image | offset subtraction | correction of temporal artifacts | gain division | interpolation of defects | corrected image |
|---|---|---|---|---|---|

Because it has been found that the linear correction is not adequate for given cases, such as notably DSA, the invention proposes an improved correction method which also involves a non-linear correction. By suitably limiting the effort and means it is achieved that, despite the improvement, the correction method is still suitable for execution in real time and that the characteristics required for correction can be determined exactly and while spending an acceptable amount of means and effort.

The method is based on the recognition of the fact that the main cause of the non-linearities occurring in the X-ray detector resides in the characteristic of the charge amplifier and the A/D converter (processing unit 12). In accordance with the invention both the non-linear inverse $F_i^{-1}$ of this characteristic and the inverse of the characteristic $L_{ij}$, assumed to be linear, of the sensor arrangement 10 are calculated by way of a calibration yet to be described. Subsequently, the corrections are applied in an order which exactly opposes that in which the artifacts are induced in the image. This order of the correction steps is stated in the following Table 3:

TABLE 3

| raw image | correction for non-linearity | offset subtraction | correction for temporal artifacts | division by gain | interpolation of defects | corrected image |
|---|---|---|---|---|---|---|
| | (column-wise) | (pixel-wise) | (pixel-wise) | (pixel-wise) | (per defect) | |

As is indicated at the bottom of FIG. 1, an X-ray dose X is converted into a quantity of light φ in the scintillator layer. This quantity of light is then converted, by way of a linear map $L_{ij}$, pixel-wise into charge signals q by the sensor arrangement 10, which charge signals themselves are column-wise converted into grey values GW by way of a non-linear map $F_i$ by the processing units 12. Hereinafter a calibration method will be described which enables calculation of approximations for the inverse values of the non-linear functions $F_i$ as well as the linear maps $L_{ij}$.

The calibration could utilize the so-called reset light or backlight, because no X-rays are required for this purpose. The following principle, however, can be readily applied also to the use of X-rays for the calibration. For the simultaneous determination of the characteristics $F_i$ for all charge amplifiers i, uniformly illuminated (by means of backlight) images are acquired for a suitable number of typically 60 different values $\phi_k$ between the minimum adjustable duration of the reset light (for example one μs) and the maximum permissible duration (for example, 60 μs). The associated grey values $GW_{ijk}$ then cover the range that can be measured in the downward direction. In the upward direction the maximum duration of the backlight must be chosen to be such that at least the range up to the maximum linear dose, or to the maximum usable dose, of the detector is covered, but saturation is not yet reached. Electronic noise is reduced during this acquisition of calibration data by averaging over a suitable number of, for example, ten images. Moreover, for example, ten dark images as well as, for example, ten images uniformly exposed to X-rays are acquired and also averaged. As opposed to the present state of the art, the averaged, uniformly exposed image is not offset-corrected by subtraction of the dark image.

The (unknown) mathematical relationship between the grey value GW and the applied quantity φ of backlight is as follows:

$$GW_{ij}(\phi)=F_i(L_{ij}(\phi))$$

For the inverse values $F_i^{-1}$ of the non-linear functions $F_i$ an approach with suitable base functions is used while for the maps $L_{ij}$ a linear approach is formed, the approximation functions being described by a respective series of unknown parameters. Furthermore, the above calibration measurements yield a number of value pairs $\{(GW_{ijk}, \phi_k)\}$ which describe the measured grey values $GW_{ijk}$ for different light quantities $\phi_k$.

Using a suitable mathematical fitting method, the unknown parameters and hence the functions can be determined from the number of measuring values and the above approaches for the functions $F_i^{-1}$ and $L_{ij}$.

Figure 2:
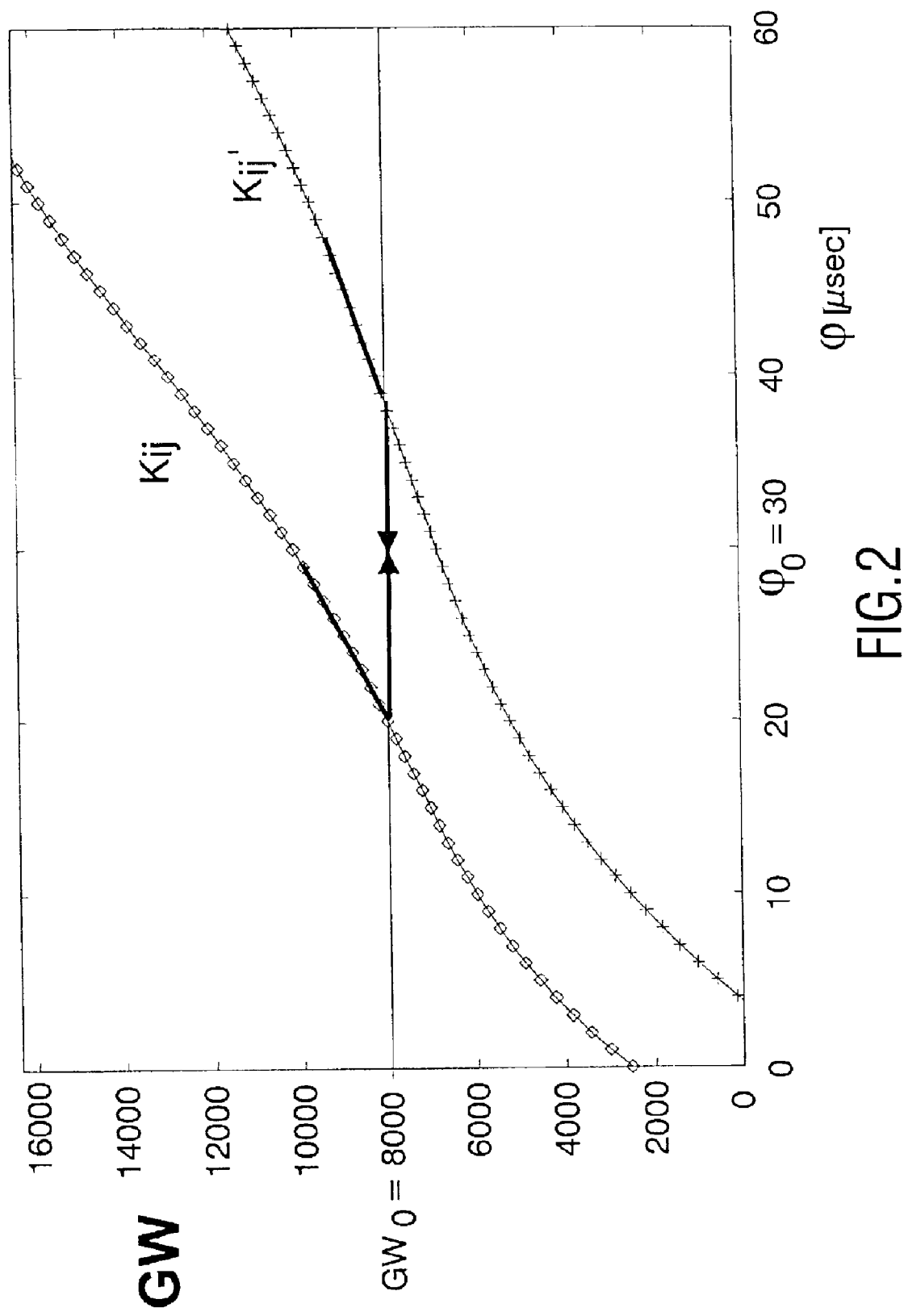
FIG. 2 shows diagrammatically two non-linear characteristics, sampled by means of two calibration measurements, of two different image sensors (pixels).

A special method of determining the unknown functions $F_i^{-1}$ and $L_{ij}$ will be described in detail hereinafter with reference to FIG. 2. FIG. 2 shows the part of this calibration data which is associated with two pixels from a (half) column, the light quantity φ (expressed as the exposure time) is plotted on the horizontal axis and the grey value GW is plotted on the vertical axis. All measuring values associated with a given pixel are linked by a compensating line, resulting in two curves $K_{ij}$ and $K_{ij'}$. These two curves thus represent the characteristics of two pixels in the same column i and two different rows j and j'. The non-linearity is shown in exaggerated form and is much smaller for a real FDXD. In this context a good local linearity of the amplifiers or analog-to-digital converters is assumed, for example, at the center of the dynamic range, that is, in FIG. 2 just above GW=8192 for a 14-bit conversion. The photodiodes deliver charge in the form of not only a constant offset but also of a number of electrons which is directly proportional to the backlight duration, and this charge is amplified and quantized so that the following relationship is obtained:

$$GW_{ij}(\phi)=F_i(s_{ij}\phi+o_{ij})$$

On the basis of the data shown in FIG. 2, the following method is then carried out:

1. The unknown offsets $o_{ij}$ for each pixel are normalized by shifting the measured curves along the φ axis; the unknown sensitivity is normalized for each pixel by stretching or compressing the φ axis. To this end, a linear regression is performed on, for example, 10 points above a threshold (for example, $GW_0$=8192). The measured curves are then shifted in such a manner that they intersect the threshold value $GW_0$ at a fixed φ value (for example, $\phi_0$=30 μs). Subsequently, the rise at this φ value is normalized by scaling the φ axis (for example, to 175 GW/μs). Overall an offset $o_{ij}$ and a scaling $s_{ij}$ are thus obtained for each pixel. A special treatment then prevents the occurrence of problems at defective pixels.

2. The characteristics of all pixels of a (half) column i are then situated one over the other with the same rise (denoted by shift arrows in FIG. 2). The "best estimate" for the common inverse characteristic $F_i^{-1}$ is then determined by adaptation of a model function with a number of free parameters $c_{iv}$. A suitable model function is a simple polynomial with, for example, 6 terms, the grey values then being mapped on the interval [0:2] for reasons of stability:

$$F_i^{-1}(GW) = \sum_{v=0}^{5} c_{iv} * \left(\frac{GW}{GW_0}\right)^v$$

More specifically, Tschebyscheff polynomials can be used instead of simple polynomials. Minimizing then takes place in the square mean of the distance between the fit function $F_i^{-1}$ and the point pairs $\{GW_{ijk}, o_{ij+}s_{ij}\phi_k\}$, where all pixels i, j of a (half) column i are used. Because this is a linear model, the adaptation of the model function to the data can be analytically solved, that is, determined exactly by solving a system of equations.

3. Subsequently, the coefficients $c_{iv}$ (parameters) for each (half) column are stored. The averaged dark image is mapped by means of the optimum approximation, and so is the averaged, uniformly exposed image. The gain image is then obtained as the difference between these mapped (linearized) images.

In the block "correction for non-linearity" of Table 3 each raw image is then mapped (linearized) by means of the polynomial $F_i^{-1}$. In the block "offset subtraction" the linearized, averaged dark image is then subtracted and in the block "division by gain" the gain image described sub 3. above is divided.

The invention is of course not limited to the described or shown embodiments, but generally extends to any embodiment, which falls within the scope of the appended claims as seen in light of the foregoing description and drawings. While a particular feature of the invention may have been described above with respect to only one of the illustrated embodiments, such features may be combined with one or more other features of other embodiments, as may be desired and advantageous for any given particular application. From the above description of the invention, those skilled in the art will perceive improvements, changes and modification. Such improvements, changes and modification within the skill of the art are intended to be covered by the appended claims.

Having described a preferred embodiment of the invention, the following is claimed:

1. A method for the correction of unequal conversion characteristics during the processing of the signals from image sensors which are distributed in a planar arrangement, the method comprising:
   generating a primary image signal from image sensors from a received quantity of radiation, each image sensor having a respective first characteristic;
   applying the primary image signals from a plurality of image sensors each time to the same processing unit, having a second, non-linear characteristic, so as to generate corresponding secondary image signals;
   determining the inverse values of the first characteristics and the non-linear inverse values of the second characteristics at least approximately from calibration measurements; and
   transforming by means of the determined inverse values the secondary image signals generated by the processing units.

2. The method of claim 1, wherein the image sensors are arranged in rows and columns, all image sensors of the same column or half column being connected to a common processing unit.

3. The method of claim 1, wherein the calibration measurements involve uniform exposure of the image sensors to known quantities of radiation between zero and a maximum value.

4. The method of claim 3, wherein the uniform exposure of the image sensors of an X-ray detector with light-sensitive elements is realized by means of X-rays or visible light, the visible light generated by backlight units.

5. The method of claim 1, wherein the non-linear inverse values of the second characteristics are approximated by a polynomial function.

6. The method of claim 1, wherein the inverse values of the first characteristics are approximated by a respective linear function including the steps of:
   calculating from the calibration measurements a measuring curve $K_{ij}$ is formed for each image sensor, which measuring curve describes the dependency of the secondary image signal on the amount of radiation $\phi$;
   calculating the desired inverse value of the first characteristic of the relevant image sensor is calculated as that linear map $L_{ij}^{-1}$ which, in combination with the measuring curve in conformity with $K_{ij} \circ L_{ij}^{-1}$
   mapping a predetermined radiation value $\phi_0$ on a predetermined secondary image signal value $GW_0$, and
   exhibiting a predetermined rise for the given radiation value $\phi_0$.

7. The method of claim 1, wherein the secondary image signals derived from the image sensors are transformed first by means of the associated non-linear inverse values of the second characteristic and subsequently by means of the inverse values of the first characteristic.

8. The method of claim 1, wherein the image sensors are sensitive to X-rays.

9. The method of claim 1, wherein the common processing unit performs amplification and signal conversion of a charge quantity into a voltage signal and an analog-to-digital conversion.

10. An X-ray detector comprising:
   image sensors arranged in rows and columns, the sensors to generate primary image signals;
   processing units whereto the image sensors of a column or a half column are connected in order to generate secondary image signals; and
   a data processing unit which is adapted to correct the secondary image signals, generated by the processing units, the correction of image signals including;
   means for determining the inverse values of the first characteristics and the non-linear inverse values of the second characteristics at least approximately from calibration measurements; and
   means for transforming by means of the determined inverse values the secondary image signals generated by the processing units.

11. The X-ray detector of claim 10 wherein the image sensors are arranged in rows and columns, all image sensors of the same column or half column being connected to a common processing unit.

12. The X-ray detector of claim 10 including means for calibration measurements involving uniform exposure of the image sensors to known quantities of radiation between zero and a maximum value.

13. The X-ray detector of claim 12, wherein the uniform exposure of the image sensors of an X-ray detector with light-sensitive elements is realized by means of X-rays or visible light, the visible light generated by backlight units.

14. The X-ray detector of claim 10 including means for approximating the non-linear inverse values of the second characteristics by a polynomial function.

15. The X-ray detector of claim 10, including:
   means for calculating from the calibration measurements a measuring curve $K_{ij}$ is formed for each image sensor, which measuring curve describes the dependency of the secondary image signal on the amount of radiation $\phi$;

means for calculating the desired inverse value of the first characteristic of the relevant image sensor is calculated as that linear map $L_{ij}^{-1}$ which, in combination with the measuring curve in conformity with $K_{ij} \circ L_{ij}^{-1}$ means for mapping a predetermined radiation value $\phi_0$ on a predetermined secondary image signal value $GW_0$, and means for exhibiting a predetermined rise for the given radiation value $\phi_0$.

16. The X-ray detector of claim 10, wherein the image sensors are sensitive to X-rays.

17. The x-ray detector of claim 10, wherein the common processing unit includes means for amplification and means for signal conversion of a charge quantity into a voltage signal and an analog-to-digital conversion.

* * * * *